(12) United States Patent
Kaneko et al.

(10) Patent No.: US 7,448,364 B2
(45) Date of Patent: Nov. 11, 2008

(54) FUEL CUTOFF VALVE AND BREATHER PIPE

(75) Inventors: Kenichiro Kaneko, Aichi-ken (JP); Shoji Horiba, Nagoya (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 11/812,395

(22) Filed: Jun. 19, 2007

(65) Prior Publication Data

US 2007/0295312 A1    Dec. 27, 2007

(30) Foreign Application Priority Data

Jun. 23, 2006    (JP) .............................. 2006-173505

(51) Int. Cl.
*F02M 37/00* (2006.01)
*F02M 37/02* (2006.01)

(52) U.S. Cl. ................. 123/510; 123/198 DB

(58) Field of Classification Search ................. 123/510, 123/198 DB, 520, 519, 518, 521, 198 D; 137/202, 43, 411, 587, 588, 589; 141/59, 141/198, 51, 290

See application file for complete search history.

(56) References Cited

U.S. PATENT DOCUMENTS

| | | | | |
|---|---|---|---|---|
| 4,905,726 A | * | 3/1990 | Kasugai et al. | 137/433 |
| 4,958,655 A | * | 9/1990 | Danek | 137/80 |
| 4,974,645 A | * | 12/1990 | Johnson | 141/59 |
| 5,183,087 A | * | 2/1993 | Aubel et al. | 141/59 |
| 5,343,905 A | * | 9/1994 | Gryc et al. | 141/59 |
| 5,373,957 A | * | 12/1994 | Gryc | 220/86.1 |
| 5,529,086 A | * | 6/1996 | Kasugai et al. | 137/202 |
| 5,535,772 A | * | 7/1996 | Roetker et al. | 137/43 |
| 5,680,848 A | * | 10/1997 | Katoh et al. | 123/518 |
| 5,950,655 A | * | 9/1999 | Benjey | 137/43 |
| 6,016,827 A | * | 1/2000 | Dawson | 137/202 |
| 6,152,199 A | * | 11/2000 | Nusbaumer et al. | 141/383 |
| 6,305,408 B1 | * | 10/2001 | Goto et al. | 137/351 |
| 6,941,966 B2 | * | 9/2005 | Mori et al. | 137/202 |
| 2002/0157706 A1 | * | 10/2002 | Bergsma | 137/202 |
| 2003/0098063 A1 | * | 5/2003 | Mori et al. | 137/202 |
| 2004/0055638 A1 | * | 3/2004 | Yamada et al. | 137/202 |
| 2004/0238033 A1 | * | 12/2004 | Miyoshi et al. | 137/202 |
| 2006/0108000 A1 | * | 5/2006 | Kaneko et al. | 137/202 |
| 2006/0213555 A1 | * | 9/2006 | Miura et al. | 137/202 |

FOREIGN PATENT DOCUMENTS

JP    11-229984    8/1999

* cited by examiner

*Primary Examiner*—Mahmoud Gimie
(74) *Attorney, Agent, or Firm*—Posz Law Group, PLC

(57) ABSTRACT

In a fuel cutoff valve of the invention, an opening at a lower end of a cylindrical bottom member defines a full level of fuel. The opening of the cylindrical bottom member has a flange that is protruded in a horizontal direction. This structure of the invention effectively interferes with invasion of the air into a casing of the fuel cutoff valve in the course of fuel supply to the full level.

4 Claims, 13 Drawing Sheets

FUEL CUTOFF VALVE AND BREATHER PIPE

CROSS REFERENCE TO RELATED APPLICATIONS

The present application claims the priority based on Japanese Patent Application No. 2006-173505 filed on Jun. 23, 2006, the disclosure of which is hereby incorporated by reference in its entirety.

BACKGROUND OF THE INVENTION

1. Field of the Invention

The present invention relates to a fuel cutoff valve and a breather pipe. The fuel cutoff valve is attached to an upper portion of a fuel tank and opens and closes a connection conduit for connecting inside of the fuel tank with outside. The breather pipe is provided in the fuel tank for connecting the inside of the fuel tank with the outside, 2. Description of the Related Art A connection conduit for letting the fuel vapor off to a canister is conventionally provided in an upper portion of a fuel tank. A fuel cutoff valve is attached to the connection conduit. The fuel cutoff valve has a float that is placed in a valve chest and lifts up and down with an increase or a decrease of buoyancy by a variation in liquid fuel level. A valve plug for opening and closing a valve seat is provided above the float. The ascending liquid fuel level in the fuel tank increases the buoyancy of the float and lifts the float up integrally with the valve plug to close the connection conduit and interfere with the outflow of fuel.

The fuel cutoff valve of this structure functions as a full level detection device for detecting a preset full level in the course of fuel supply. The valve plug lifted up integrally with the float closes the connection conduit and increases the inner pressure of the fuel tank to automatically stop the fuel supply from a fuel gun. The detection position of the full level is generally the operation end position of the float and is thus significantly varied with a variation in flow rate of fuel supply. In a proposed fuel cutoff valve of a breather pipe type, the detection position of the full level is defined by the height of a lower opening end of a casing for receiving a float therein (see, for example, JP-A 11-229984).

In the prior art fuel cutoff valve of this proposed structure, the lower opening end of the casing has only a small contact area with the liquid surface of increasing fuel. The liquid surface of fuel gradually increases to the full level while occasionally being in contact with and occasionally being apart from the opening end. In the course of such fuel supply, the air is entrained from the air layer in the fuel tank into a casing CS as shown in FIG. 18. Namely the air is disadvantageously invaded into the casing CS.

Invasion of the air into the casing or more specifically into a valve chest, the liquid fuel flow is mixed with a large amount of the air. The large air content of the liquid fuel undesirably lowers the buoyancy of the float. This prevents the float from producing an adequate level of buoyancy.

SUMMARY

An advantage of some aspects of the invention is to prevent invasion of the air into a casing in the course of fuel supply to a full level.

According to a first aspect of the invention, a fuel cutoff valve is attached to an upper portion of a fuel tank and opens and closes a connection conduit for connecting inside of the fuel tank with outside. The fuel cutoff valve has: a casing that forms a valve chest for communicating the inside of the fuel tank with the connection conduit and has an opening, which is opened from the valve chest to the inside of the fuel tank and is closed by a rise of a liquid fuel level in the fuel tank to a predetermined liquid level to increase a pressure difference between an inner pressure of the fuel tank and an inner pressure of the valve chest; a float that is placed in the valve chest and lifts up and down with an increase and decrease of buoyancy caused by a variation in liquid fuel level in the valve chest; and a valve plug that is attached to the float and lifts up and down with the float to close and open the connection conduit. The opening of the casing has an extension that is protruded in a horizontal direction at a position corresponding to the predetermined liquid level.

When the liquid fuel level in the fuel tank reaches the predetermined liquid level in the course of fuel supply to the fuel tank equipped with the fuel cutoff valve, the opening is closed by the liquid surface of the increasing liquid fuel level. This raises the inner pressure of the fuel tank and increases the pressure difference between the inner pressure of the fuel tank and the inner pressure of the valve chest. The increased pressure difference allows the fuel to be flowed from the fuel tank into the valve chest. The fuel inflow increases the buoyancy and lifts the float up integrally with the valve plug. The ascending valve plug closes the connection conduit to disconnect the inside of the fuel tank from the outside and thus prevents the outflow of the fuel from the fuel tank.

In the fuel cutoff valve, the extension protruded in the horizontal direction is provided at the position of the opening of the casing corresponding to the predetermined liquid level. The presence of the extension increases the contact area of the opening with the liquid fuel of the ascending liquid level. The liquid surface of fuel rises by the surface tension. Under the condition of a sufficiently large contact area of the liquid fuel with the opening, when the liquid fuel level reaches a preset liquid level that is slightly below the predetermined liquid level, a raised portion of the liquid surface by the surface tension effect is in contact with the opening over a relatively large contact area. Before the liquid surface of fuel reaches the predetermined liquid level, the raised portion of the liquid surface by the surface tension effect sufficiently closes and blocks the circumference of the opening. Namely the circumference of the opening is blocked and sealed first by the surface tension effect in the process of closing and blocking the opening. This arrangement effectively interferes with the entrainment of the air from the air layer into the valve chest, which is observed in the prior art structure as shown in FIG. 18. Such interference desirably prevents invasion of the air into the casing of the fuel cutoff valve.

According to a second aspect of the invention, a breather pipe is provided in a fuel tank for connecting inside of the fuel tank with outside. The breather pipe has an opening end that is located inside the fuel tank. The opening end of the breather pipe has an extension protruded in a horizontal direction.

When the liquid fuel level in the fuel tank reaches the height of the opening end of the breather pipe located inside the fuel tank in the course of fuel supply, the inner pressure of the fuel tank raises to activate the auto stop function of the breather pipe. The opening end of the breather pipe located inside the fuel tank has the extension protruded in the horizontal direction. The presence of the extension increases the contact area of the opening end of the breather pipe with the liquid fuel of the ascending liquid level. The liquid surface of fuel rises by the surface tension. Under the condition of a sufficiently large contact area of the liquid fuel with the opening end, when the liquid fuel level reaches a preset liquid level that is slightly below the predetermined liquid level or the auto stop level, a raised portion of the liquid surface by the surface tension effect is in contact with the opening end over a relatively large contact area. Before the liquid surface of fuel reaches the predetermined liquid level or the auto stop level, the raised portion of the liquid surface by the surface tension effect sufficiently closes and blocks the circumference of the opening end. Namely the circumference of the opening end is blocked and sealed first by the surface tension effect in the process of closing and blocking the opening end. This arrangement effectively interferes with the entrainment of the air from the air layer in the fuel tank into the breather pipe. Such interference desirably prevents the fuel mixed with the air from being flowed through the breather pipe and splashed as fuel droplets at the fuel supply port Invasion of the air into the breather pipe accelerates the vaporization of fuel and increases the amount of fuel vapor discharged outside the fuel tank. The structure of the second aspect of the invention desirably interferes with invasion of the air into the breather pipe as described above and accordingly reduces the amount of fuel vapor discharged outside the fuel tank.

DESCRIPTION OF THE PREFERRED EMBODIMENTS

In order to clarify the structures, the features, the characteristics, and the functions of the invention, some modes of carrying out the invention are described below as preferred embodiments with reference to the accompanied drawings.

A. First Embodiment (1) General Structure of Fuel Tank FT

Figure 1:
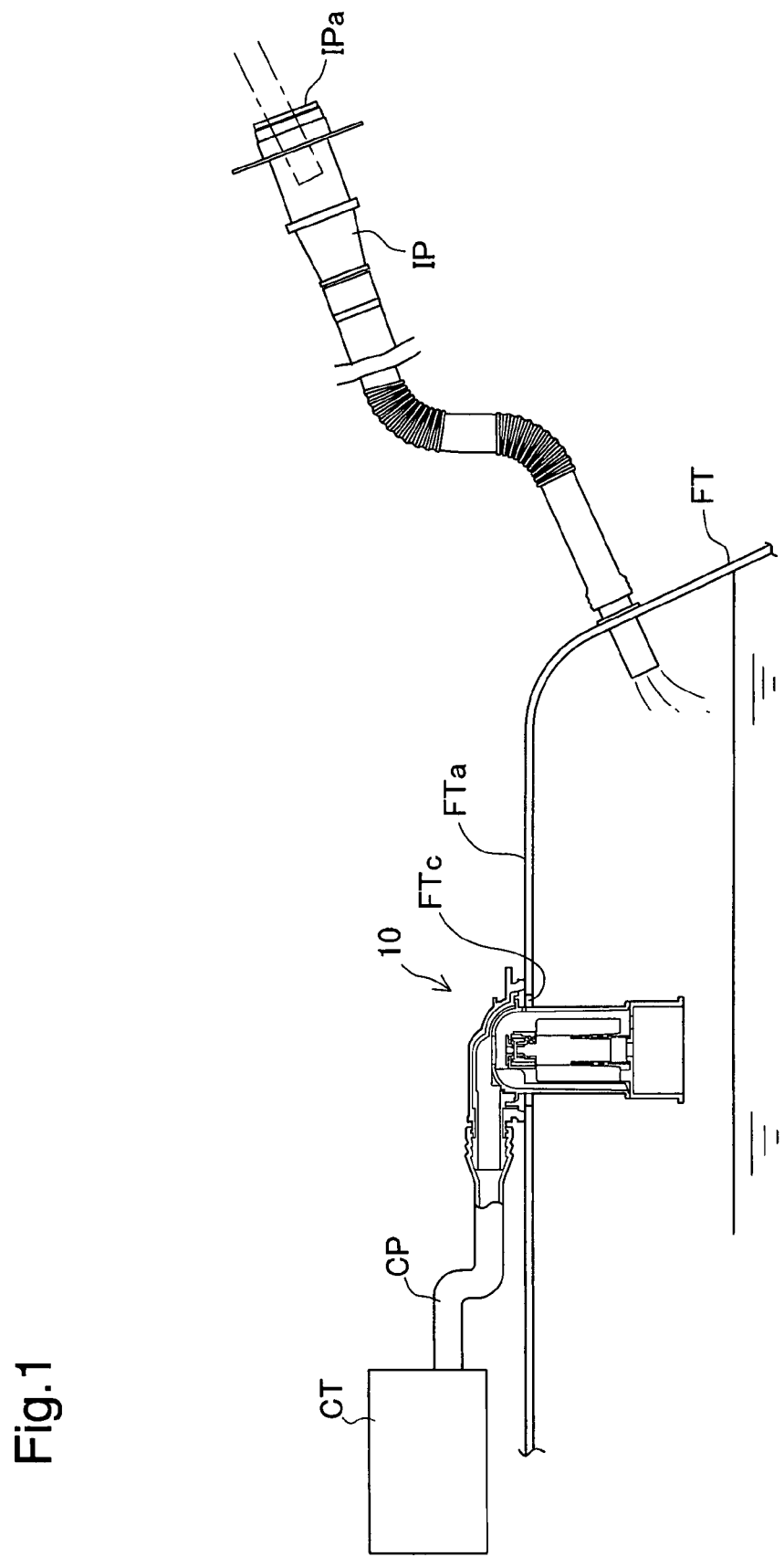
FIG. 1 schematically illustrates the configuration of a feeding device for a fuel tank of an automobile in a first embodiment of the invention.

FIG. 1 schematically illustrates the configuration of a feeding device for a fuel tank of an automobile in a first embodiment of the invention. As illustrated, a fuel tank FT has a barrier layer made of ethylene vinyl alcohol copolymer (EVOH) and an outer layer made of polyethylene (PE). A fuel filler pipe IP is connected to an upper portion of the fuel tank FT. The fuel filler pipe IP has a fill port IPa that is opened and closed with a fuel cap. A supply of fuel from a fuel gun is flowed through the fill port IPa into the fuel tank FT. An upper tank wall FTa on the top of the fuel tank FT has a mounting hole FTc, which receives a fuel cutoff valve 10 having its lower portion inserted therein. The fuel cutoff valve 10 is connected to a canister CT via a canister connection pipe CP. The fuel cutoff valve 10 is a breather pipe type and has an auto stop function. When the liquid fuel level in the fuel tank FT rises to a predetermined liquid level FL1 in the course of fuel supply, the fuel cutoff valve 10 controls the outflow of the fuel to the canister CT and automatically stops the fuel supply. The structure and the functions of the fuel cutoff valve 10 are described below in detail.

(2) Structure of Fuel Cutoff Valve 10

Figure 2:
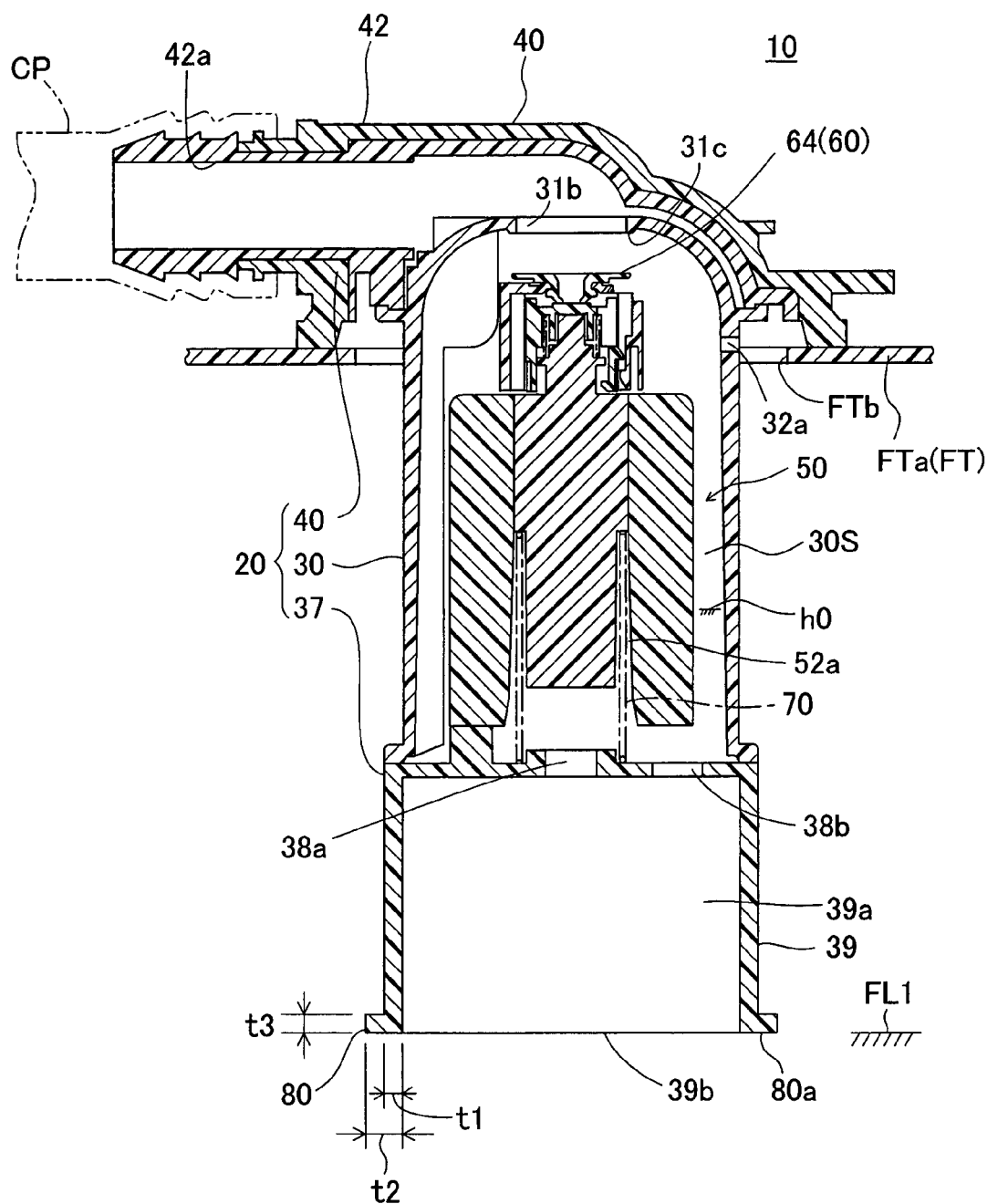
FIG. 2 is a sectional view showing the structure of a fuel cutoff valve included in the feeding device of the first embodiment of the invention.

FIG. 2 is a sectional view showing the structure of the fuel cutoff valve 10 in the first embodiment of the invention. As illustrated, the fuel cutoff valve 10 has a casing 20, a float mechanism 50, and a spring 70 as its main constituents. The casing 20 includes a casing body 30, a bottom member 37, and a cover member 40. The space defined by the casing body 30 and the bottom member 37 forms a valve chest 30S. The float mechanism 50 supported by the spring 70 is placed in the valve chest 30S.

Figure 3:
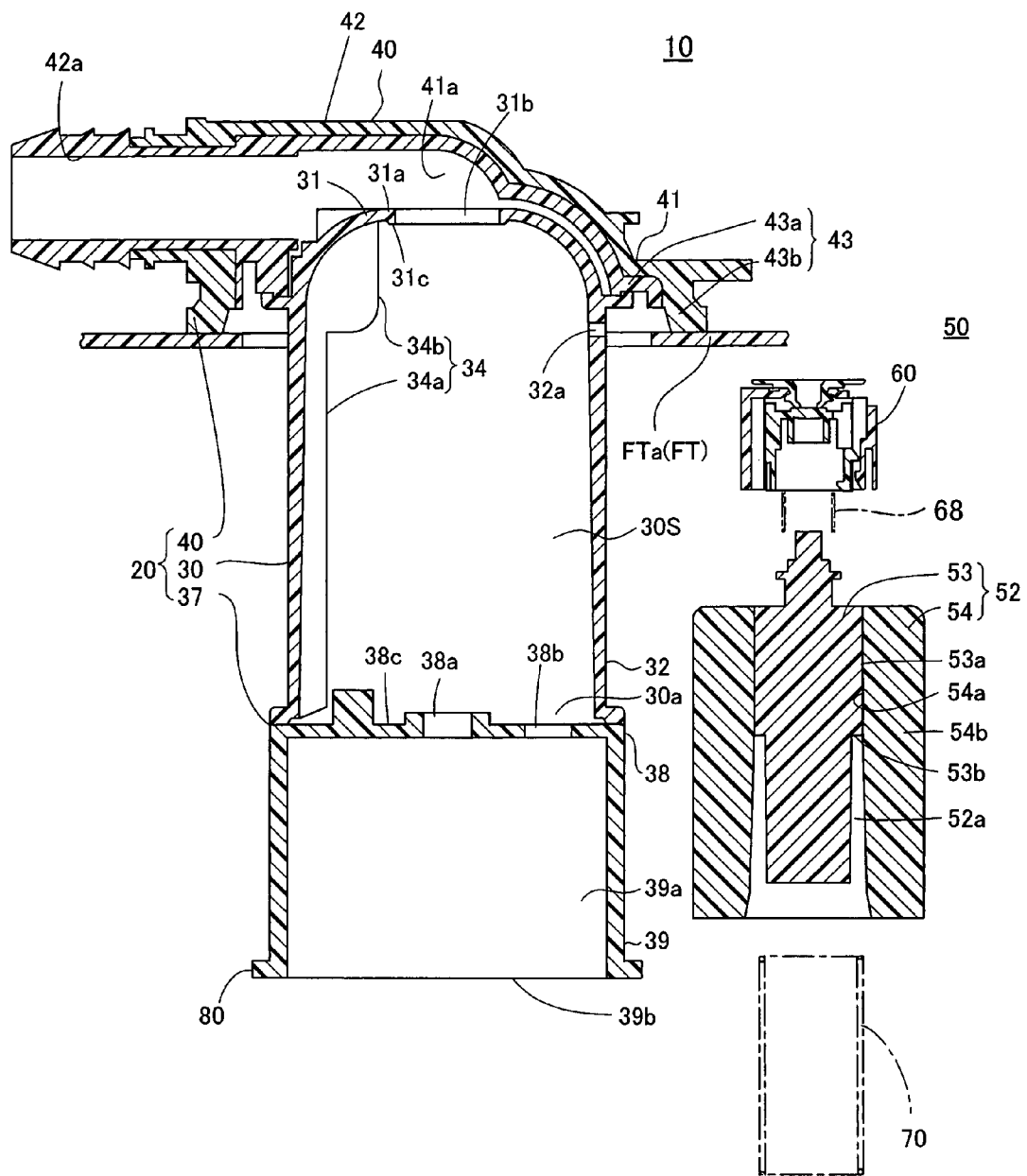
FIG. 3 is a decomposed sectional view showing the structure of the fuel cutoff valve.

FIG. 3 is a decomposed sectional view showing the structure of the fuel cutoff valve 10. The casing body 30 is formed in a cup shape defined by a ceiling wall element 31 and a side wall element 32 and has a bottom opening 30a. A conduit forming projection 31a protruded downward is formed in a center area of the ceiling wall element 31. A connection conduit 31b is formed to pass through the conduit forming projection 31a. One end of the connection conduit 31b close to the valve chest 30S forms a sealing element 31c. The side wall element 32 has a first connection hole 32a that connects the inside of the fuel tank FT with the valve chest 30S. The inner face of the side wall element 32 has four ribs that are arranged in the circumferential direction and are formed as case guide elements 34 for guiding the float mechanism 50. Each of the case guide elements 34 has a lower guide rib 34a formed in the lower portion of the casing body 30 and an upper guide rib 34b protruded more inwardly toward the axial center than the lower guide rib 34a.

The bottom member 37 closes a part of the bottom opening 30a of the casing body 30 and functions to introduce the fuel vapor and the liquid fuel into the valve chest 30S. The bottom member 37 includes a bottom plate 38 and a cylindrical element 39 that are formed integrally. The outer circumference of the bottom plate 38 is welded to a lower end of the casing body 30. The bottom plate 38 has communicating apertures 38a and 38b and a spring support element 38c for supporting a lower end of the spring 70. The cylindrical element 39 forms an introducing conduit 39a to introduce the fuel vapor and the liquid fuel taken in through a lower opening 39b into the valve chest 30S via the communicating aperture 38a.

Figure 4:
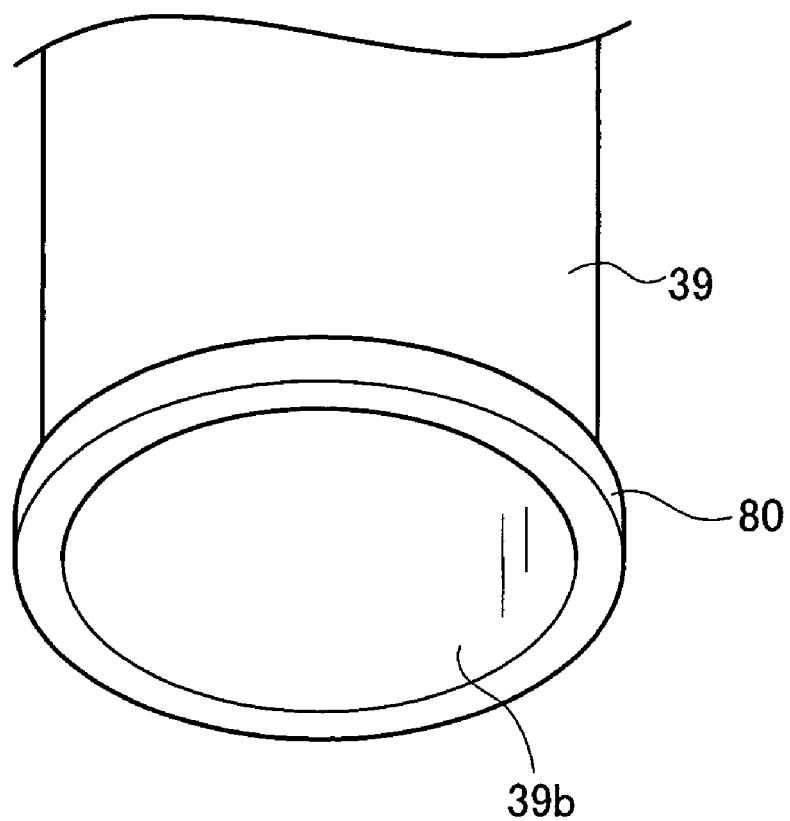
FIG. 4 is a perspective view showing the structure of a lower opening of a cylindrical element in the fuel cutoff valve 10.

FIG. 4 is a perspective view showing the structure of the lower opening 39b of the cylindrical element 39. As illustrated, the lower opening 39b of the cylindrical element 39 has a horizontal ledge 80 protruded in the horizontal direction. The horizontal ledge 80 is a flange (outward flange) that is protruded outward around the whole circumference of the opening 39b of the cylindrical element 39. The horizontal ledge or flange 80 is formed integrally with the cylindrical element 39. In one modified structure, the flange 80 may be formed separately from the cylindrical element 39 and fixed to its opening 39b by thermal caulking or by welding. In the structure of the embodiment, the cylindrical element 39 has a wall thickness t1 of 1 to 2 mm (for example, 1.5 mm). The flange 80 has a width t2 (subtraction of the inner diameter from the outer diameter) of 2 to 5 mm (for example, 3 mm) and a thickness t3 (a dimension in the vertical direction) of 1 to 2 mm (for example, 1.5 mm) (see FIG. 2). The dimensions t1 through t3 are not restricted to the above values but may be any suitable values.

Referring back to FIG. 2, the cover member 40 includes a cover body 41, a pipe member 42 that is protruded sideways from the center of the cover body 41, and a flange 43 that is formed around the outer circumference of the cover body 41. The cover body 41, the pipe member 42, and the flange 43 are formed integrally. The pipe member 42 has a cover conduit 42a. The cover conduit 42a has one end connected via the connection conduit 31b to the valve chest 30S of the casing body 30 and the other end connected to the canister connection pipe CP. A lower end of the cover body 41 forms an inner welding end 43a for welding an upper end of the outer circumference of the casing body 30. A lower end of the flange 43 forms an outer welding end 43b welded to the upper tank wall FTa of the fuel tank FT.

The float mechanism 50 has a dual valve structure of the improved valve re-opening property. The flat mechanism 50 has a float 52 and a valve plug 60 located above the float 52. The flat 52 includes a first float 53 and a second float 54 that are integrally assembled. The first float 53 has a first float body 53a. The second float 54 is formed in a cylindrical shape and has a second float body 54b with a receiving hole 54a. The first float 53 is fit in the receiving hole 54a of the second float 54 and is accordingly integrated with the second float 54. The first float 53a has a step formed around its outer circumference as a spring support element 53b to support an upper end of the spring 70. The spring 70 is placed in a spring receiving space 52a (see FIG. 2) between the first float 53 and the second float 54. The spring 70 is supported by the spring support element 38c of the bottom member 37.

Figure 5:
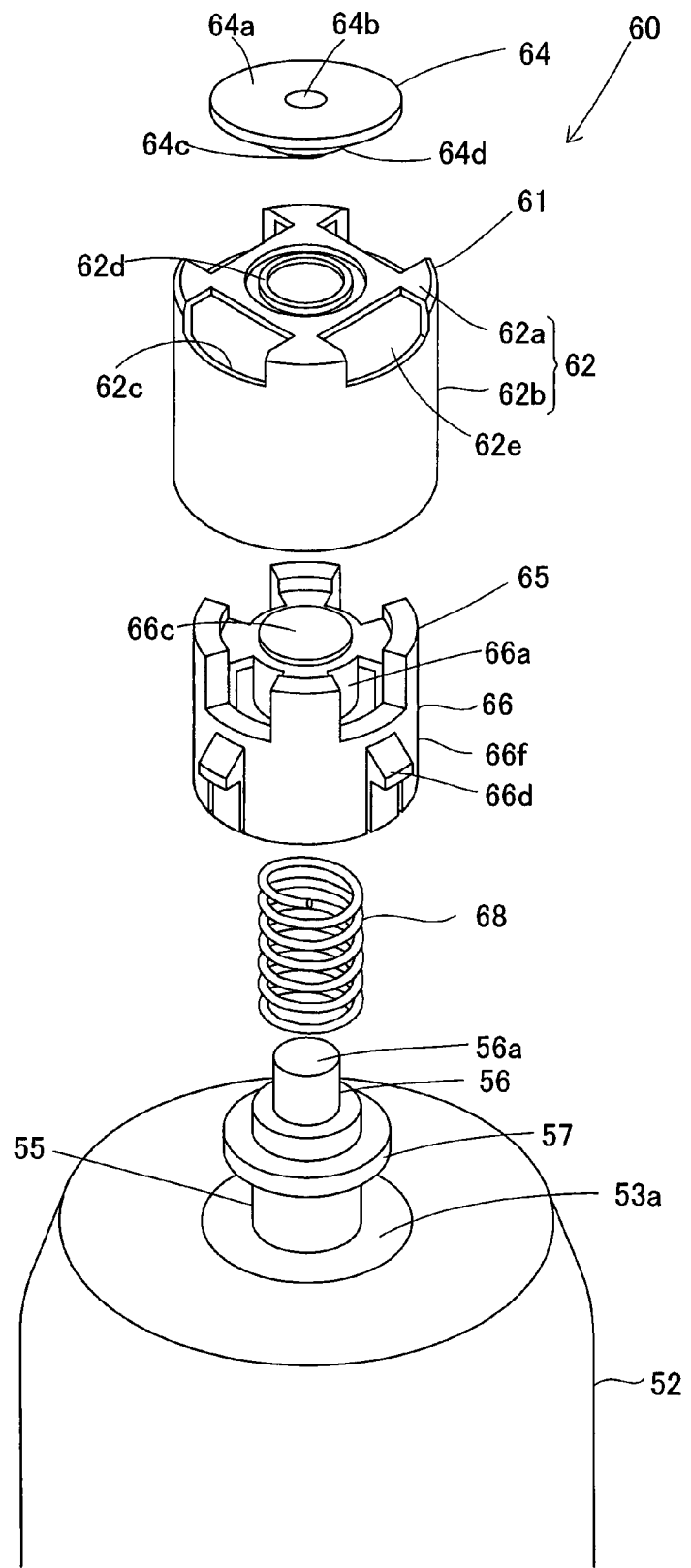
FIG. 5 is a decomposed perspective view showing the structure of a float and a first valve section and a second valve section of a valve plug in the fuel cutoff valve.
Figure 6:
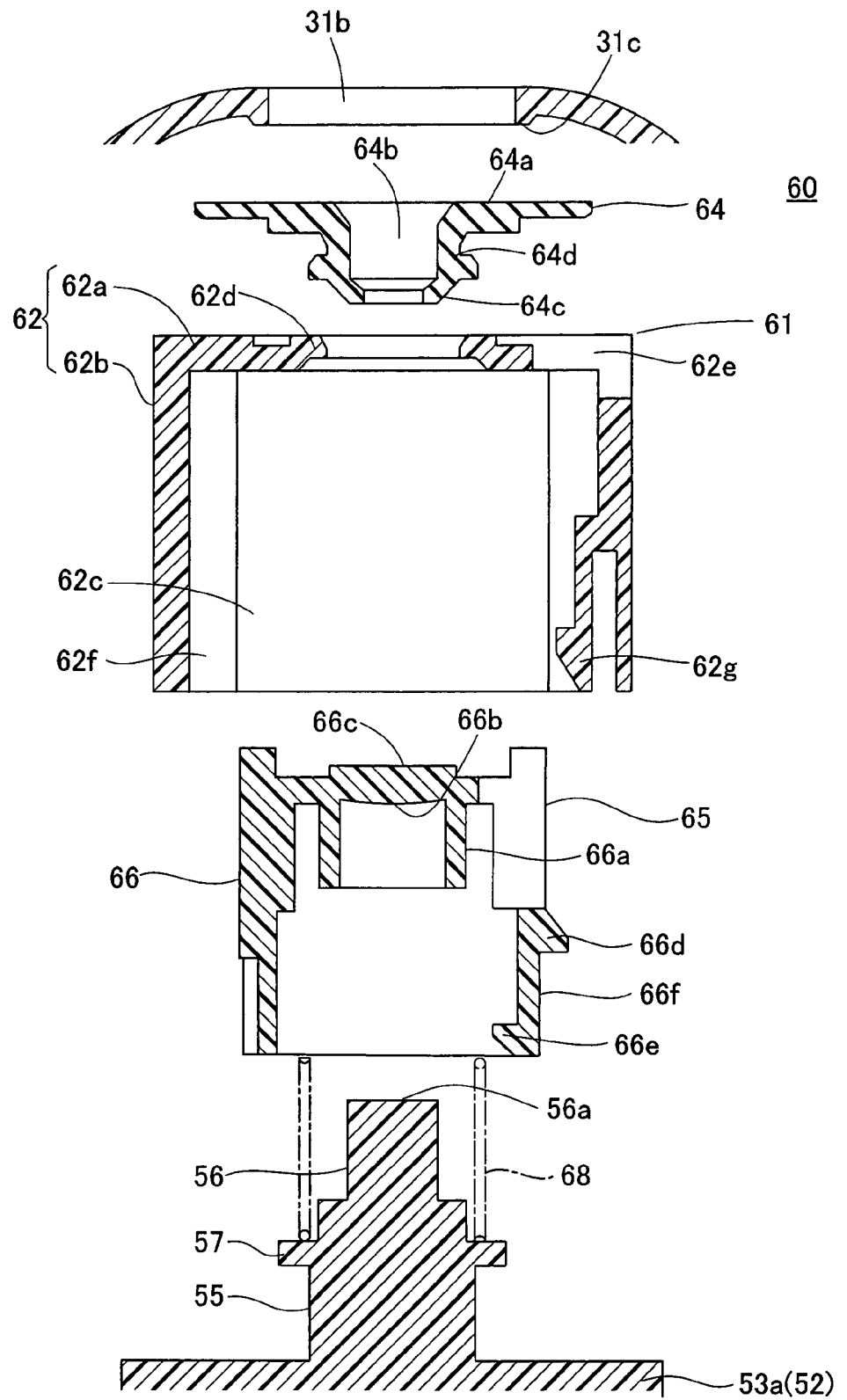
FIG. 6 is a sectional view showing the structure of the valve plug in the fuel cutoff valve.

FIG. 5 is a decomposed perspective view showing the structure of the float 52 and a first valve section 61 and a second valve section 65 of the valve plug 60. FIG. 6 is a sectional view showing the structure of the valve plug 60. A valve support element 55 is protruded from the top of the first float body 53a. The valve support element 55 supports the valve plug 60 to allow flutter of the valve plug 60. The valve support element 55 has a columnar support projection 56. The support projection 56 has a support plane 56a on its top end. A ring-shaped projection 57 is formed around the outer circumference of the valve support element 55 to retain the valve plug 60.

The valve plug 60 includes a first valve section 61 and a second valve section 65 and is supported by the valve support element 55 of the float 52 to be movable along a vertical axis and flutters. The first valve section 61 has a bottomed cylindrical valve body 62 and a seat member 64 attached to the valve body 62. The valve body 62 has a top face 62a and a cylindrical side wall 62b protruded from the outer circumference of the top face 62a. The inner space of the cylindrical side wall 62b forms a supporting hole 62c. A mounting element 62d is formed on the center of the top face 62a for fixation of the seat member 64. Four communication holes 62e for connecting the supporting hole 62c to the outside are formed in an upper portion of the valve body 62 to be arranged along the outer circumference of the valve body 62. As shown in FIG. 6, four guide ribs 62f are formed on an inner face of the side wall 62b of the valve body 62 to be respectively extended in the vertical direction and arranged at equal intervals in the circumferential direction. These guide ribs 62f work to guide the second valve section 65 in a vertically movable manner. An elastically deformable catching claw 62g is formed around the inner face of the side wall 62b to catch the second valve section 65.

The seat member 64 includes a seating element 64a that is seated on and detached from the sealing element 31c, a connection hole 64b that passes through the center of the seating element 64a and is connected with the supporting hole 62c, a seat element 64c that is formed on a lower end of the connection hole 64b, and a mounting element 64d that is formed around the outer circumference of the connection hole 64b. The seating element 64a, the connection hole 64b, the seat element 64c, and the mounting element 64d are all made of a rubber material and are integrally formed to the integral seat member 64. The seat member 64 is attached to the valve body 62 by press fitting the mounting element 64d into the mounting element 62d of the valve body 62. The seating element 64a has a gap apart from the top face 62a of the valve body 62 and is elastically deformed to be seated on the sealing element 31c with the enhanced sealing property.

The second valve section 65 has a second valve body 66 in a cylindrical shape. The second valve body 66 has a guide element 66a of a bottomed cylinder with a lower opening. The guide element 66a is set on the support projection 56 across a predetermined clearance and accordingly prevents a significant inclination of the second valve section 65 relative to the float 52. The guide element 66a has a support convex 66b that is formed on the center of its top face and is slightly curved downward. The support convex 66b is placed on the support plane 56a of the float 52, so that the second valve section 65 is supported about the valve support element 55 as its supporting point to allow flutter.

A second sealing element 66c is formed on the top face of the second valve body 66. The second sealing element 66c is seated on and detached from the seat element 64c of the first valve section 61 to close and open the connection hole 64b. Four retaining claws 66d are formed on a lower portion of the second valve body 66. These retaining claws 66d are caught by the catching claw 62g of the first valve section 61. The first valve section 61 is accordingly supported on the second valve section 65 to be movable in the vertical direction relative to the second valve section 65. A catching claw 66e is formed on an inner wall of the second valve body 66 to be caught by the ring-shaped projection 57 of the float 52. The second valve body 65 is accordingly supported and retained on the float 52 to be movable in the vertical direction relative to the float 52.

The center of gravity of the valve plug 60 is located below the support convex 66b. The valve body 62 of first valve section 61 and the second valve body 66 of the second valve section 65 are both cylindrical in shape and are extended below the support convex 66b supported by the support plane 56a. A spring 68 is interposed between the ring-shaped projection 57 of the float 52 and the bottom face of the valve plug 60, so that the float 52 supports the valve plug 60 via the spring 68.

Figure 7:
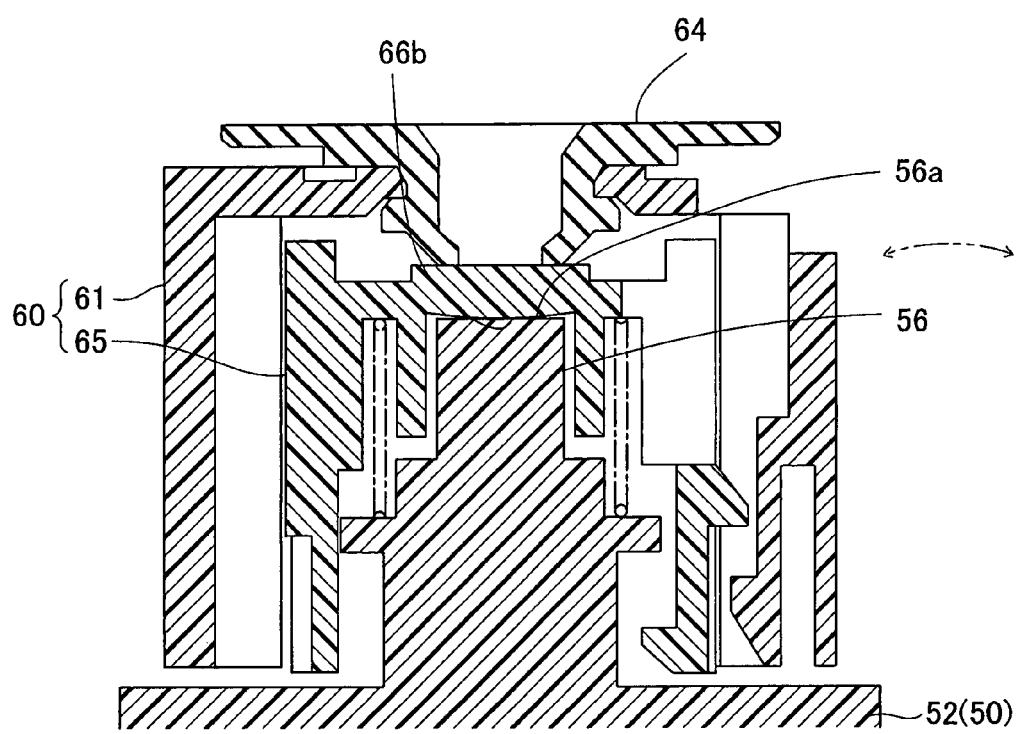
FIG. 7 shows the functions of a float mechanism.

FIG. 7 shows the functions of the float mechanism 50. In the illustrated example of FIG. 7, the float 52 is slanted in the direction of an arrow, for example, due to inclination of the vehicle. Since the curved support convex 66b is supported at one point by the support plane 56a of the float 52, the second valve section 65 is balanced like a balancing toy. The seat member 64 of the first valve section 61 accordingly keeps the horizontal attitude.

(3) Operations of Fuel Cutoff Valve 10

The following describes the operations of the fuel cutoff valve 10. As shown in FIG. 2, in the course of supply of the fuel into the fuel tank FT, with an increase in liquid fuel level in the fuel tank FT, the fuel vapor accumulated in the upper portion in the fuel tank FT flows through the lower opening 39b and the introducing conduit 39a of the cylindrical element 39 and the communicating apertures 38a and 38b into the valve chest 30S. The fuel vapor then flows from the valve chest 30S through the connection conduit 31b and the cover conduit 42a and is let off to the canister CT. When the liquid fuel level in the fuel tank FT reaches the predetermined liquid level FL1, which is equivalent to the position of the opening 39b of the cylindrical element 39, the liquid fuel blocks the opening 39b to increase the inner pressure of the fuel tank FT. In this state, there is a large pressure difference between the inner pressure of the fuel tank FT and the inner pressure of the valve chest 30S. The liquid fuel accordingly flows through the introducing conduit 39a of the cylindrical element 39 and the communicating apertures 38a and 38b into the valve chest 30S. This fuel flow raises the liquid fuel level in the valve chest 30S.

Figure 8:
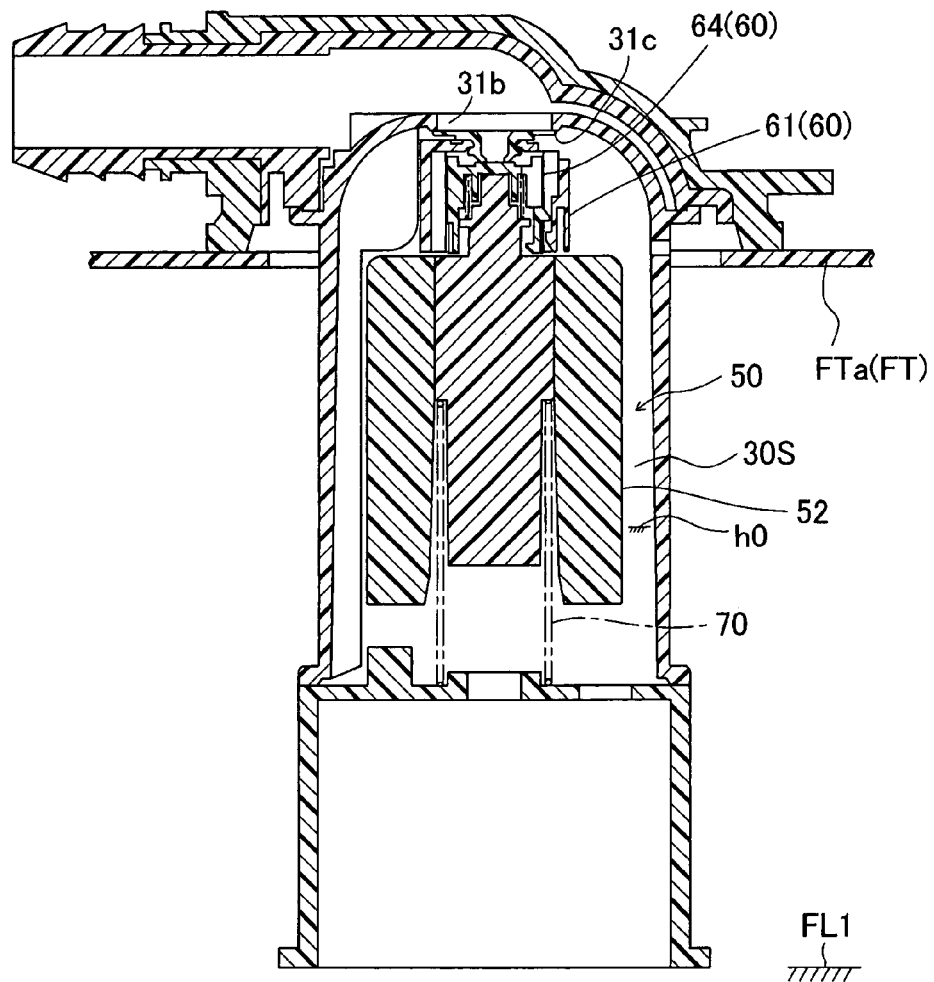
FIG. 8 shows one operation state of the fuel cutoff valve.

When the liquid fuel level in the valve chest 30S reaches a preset height 'h0' as shown in FIG. 8, the total of the buoyancy of the float 52 and the upward force by the loading of the spring 70 exceeds the downward force by the dead weight of the float mechanism 50. This lifts the integral float mechanism 50 up and makes the seat member 64 of the valve plug 60 seated on the sealing element 31c to close the connection conduit 31b. In the closed position of the connection conduit 31b, the fuel remains in the fuel filler pipe IP to be in contact with the fuel gun and activates the auto stop function. This structure lets the fuel vapor out of the fuel tank FT while preventing the outflow of the liquid fuel from the fuel tank FT in the course of fuel supply into the fuel tank FT.

Figure 9:
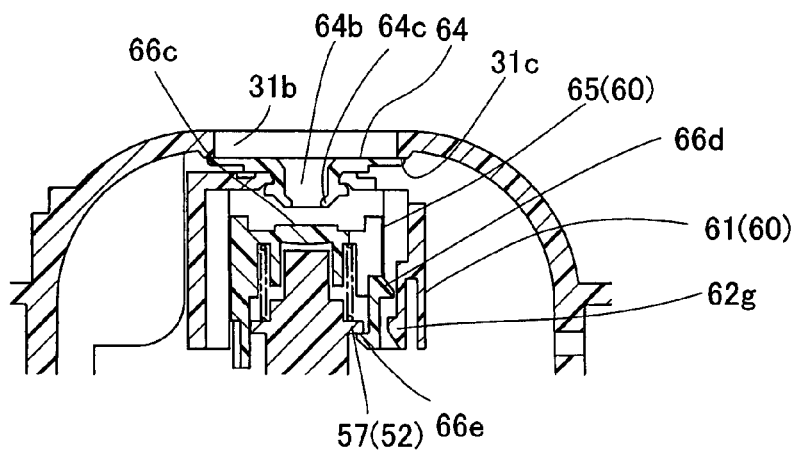
FIG. 9 shows a subsequent operation state of the fuel cutoff valve after the state of FIG. 8.

With consumption of the fuel in the fuel tank FT to lower the liquid fuel level, the float 52 decreases its buoyancy and moves down. The descending float 52 pulls the second valve section 65 down via engagement of the ring-shaped projection 57 of the float 52 with the catching claw 66e of the second valve section 65 as shown in FIG. 9. The second sealing element 66c is then detached from the seat element 64c to open the connection hole 64b. The opened connection hole 64b causes the pressure below the first valve section 61 to be substantially equivalent to the pressure in the neighborhood of the connection conduit 31b. The first valve section 61 is pulled down together with the second valve section 65 via engagement of the retaining claws 66d and the catching claw 62g. As the first valve section 61 moves down, the seat member 64 is separated from the sealing element 31c to open the connection conduit 31b. This dual valve structure of the first valve section 61 and the second valve section 65 improves the valve re-opening property. As the seat element 64c is detached from the second sealing element 66c to allow the connection of the connection hole 64b of the reduced passage area, the pressure below the first valve section 61 is reduced to decrease the force of the first valve section 61 in its valve closing direction. This arrangement ensures the enhanced valve re-opening property.

(4) Functions and Effects of First Embodiment

As described above, when the liquid fuel level in the fuel tank FT reaches the predetermined liquid level FL1 that completely blocks the opening 39b in the course of fuel supply, the inner pressure of the fuel tank FT increases to activate the auto stop function. In the fuel cutoff valve 10 of the first embodiment, the cylindrical bottom member 37 is welded to the bottom of the casing body 30 that forms the valve chest 30S for receiving the float 52 placed therein. The opening 39b at the lower end of the bottom member 37 defines the full level of liquid fuel. In the prior art fuel cutoff valve of the conventional structure that detects the full level only when the liquid fluid level rises to the operation end position of the float, the detection position of the full level is significantly varied with a variation in flow rate of fuel supply. In the fuel cutoff valve 10 of the first embodiment, on the other hand, the full level of liquid fuel is determined by the opening 39b at the lower end of the bottom member 37. This desirably enhances the detection accuracy of the full level.

In the fuel cutoff valve 10 of the first embodiment, the flange 80 extended outward in the horizontal direction is formed around the whole circumference of the opening 39b of the casing 20. The position of the flange 80 or more strictly the position of a lower face 80a of the flange 80 (see FIG. 2) is equivalent to the predetermined liquid level FL1. Namely the flange 80 is provided at the predetermined liquid level FL1 around the opening 39b of the casing 20. The presence of the flange 80 increases the contact area of the opening 39b with the liquid fuel of the ascending liquid level.

Figure 10A:
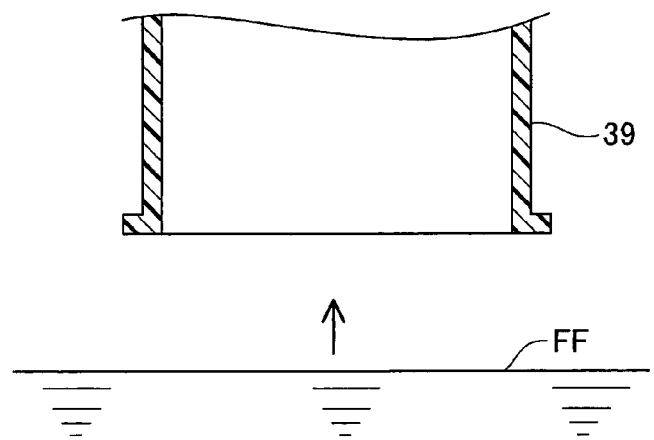
FIGS. 10A and 10B show the change of liquid surface with a rise of liquid fuel level in the fuel tank.
Figure 10B:
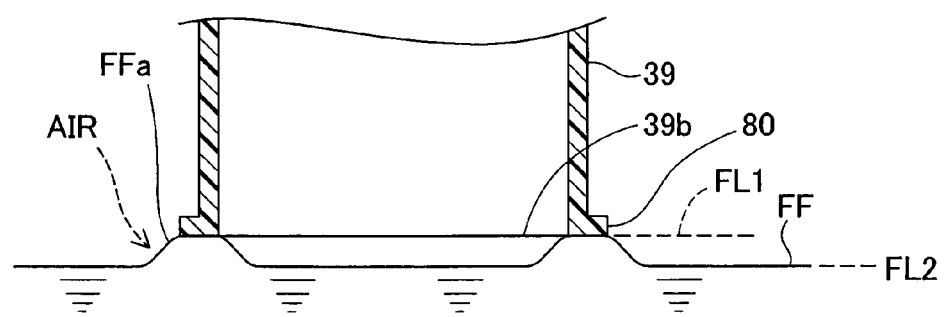
Figure 18:
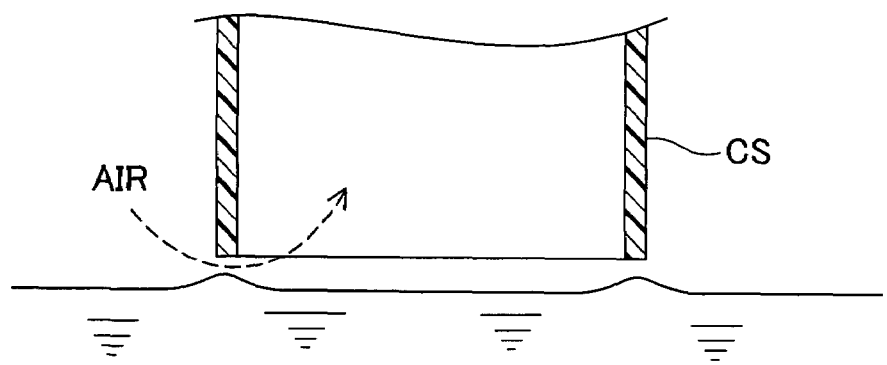
FIG. 18 shows a problem arising in a fuel cutoff valve of a prior art structure.

FIGS. 10A and 10B show the change of liquid surface with a rise of liquid fuel level in the fuel tank FT. A liquid surface FF of fuel gradually rises as shown in FIG. 10A and reaches a liquid level FL2 that is slightly below the predetermined liquid level FL1 in the state of FIG. 10B. The liquid surface FF of fuel rises by the surface tension. Under the condition of a sufficiently large contact area of the liquid fuel with the opening 39b, in the state of FIG. 10B where the liquid surface FF of fuel reaches the liquid level FL2, a raised portion FFa of the liquid surface FF by the surface tension effect is in contact with the opening 39b over a relatively large contact area. Before the liquid surface FF of fuel reaches the predetermined liquid level FL1, the raised portion FFa of the liquid surface FF by the surface tension effect sufficiently closes and blocks the circumference of the opening 39b. The circumference of the opening 39b is blocked and sealed first by the surface tension effect in the process of closing and blocking the opening 39b. This arrangement effectively interferes with the entrainment of the air from the air layer into the valve chest 30S as shown in FIG. 18 and prevents invasion of the air into the valve chest 30S.

The structure of the fuel cutoff valve 10 of the first embodiment desirably prevents the lowered buoyancy of the float 52 and the resulting delayed action of the valve plug 60 due to the air invaded into the fuel flowed in the valve chest 30S. This arrangement effectively restrains leakage of the fuel from the connection conduit 31b.

(5) Modifications of First Embodiment

The structure of the fuel cutoff valve 10 of the first embodiment may be modified in various ways.

Figure 11:
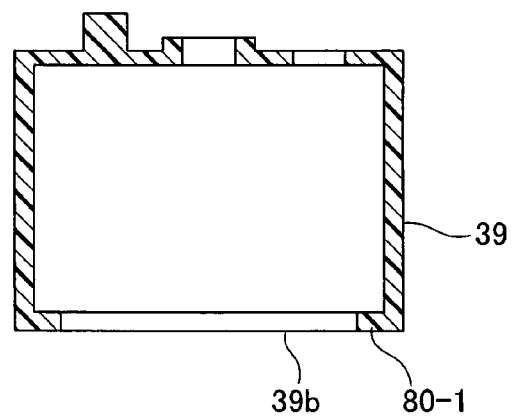
FIG. 11 is a sectional view showing the structure of the opening of the cylindrical element in a fuel cutoff valve of a first modified example.

(5-1) FIG. 11 is a sectional view showing the structure of the opening 39b of the cylindrical element 39 in a fuel cutoff valve of a first modified example. In the fuel cutoff valve 10 of the first embodiment, the outward flange 80 is formed around the circumference of the opening 39b. In the structure of the first modified example, an inward flange 80-1 is formed in place of the outward flange 80. The inward flange 80-1 is formed around the whole circumference of the opening 39b to be protruded inward in the horizontal direction. The inward flange 80-1 may be formed integrally with the cylindrical element 39 like the structure of the first embodiment or may be formed separately and fastened to the cylindrical element 39. The structure of the first embodiment increases the contact area of the opening 39b with the liquid surface at the rise of the liquid fuel level and thus effectively restrains invasion of the air from the air layer into the valve chest in the fuel shutoff state.

Figure 12:
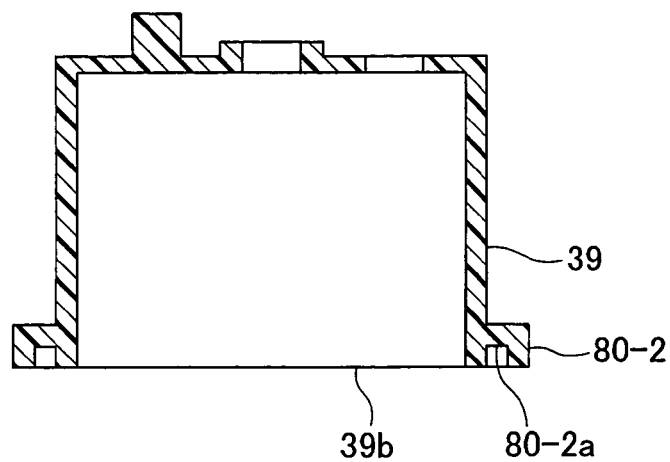
FIG. 12 is a sectional view showing the structure of the opening of the cylindrical element in a fuel cutoff valve of a second modified example.

(5-2) FIG. 12 is a sectional view showing the structure of the opening 39b of the cylindrical element 39 in a fuel cutoff valve of a second modified example. In the fuel cutoff valve 10 of the first embodiment, the outward flange 80 of flat plate is formed around the circumference of the opening 39b. The outward flange 80 of flat plate may be replaced by an extension 80-2 with a groove 80-2a that is cut around the circumference of its lower face as shown in FIG. 12. This structure also increases the contact area of the opening 39b with the liquid surface at the rise of the liquid fuel level, compared with the conventional structure without any extension or flange. This arrangement thus effectively restrains invasion of the air from the air layer into the valve chest in the fuel shutoff state, like the first embodiment and the first modified example.

(5-3) In the first embodiment and the first modified example described above, the outward flange 80 or the inward flange 80-1 is formed around the whole circumference of the opening 39b. An outward or inward extension protruded in the horizontal direction may be formed along only part of the circumference of the opening 39b.

B. Second Embodiment (1) Structure

Figure 13:
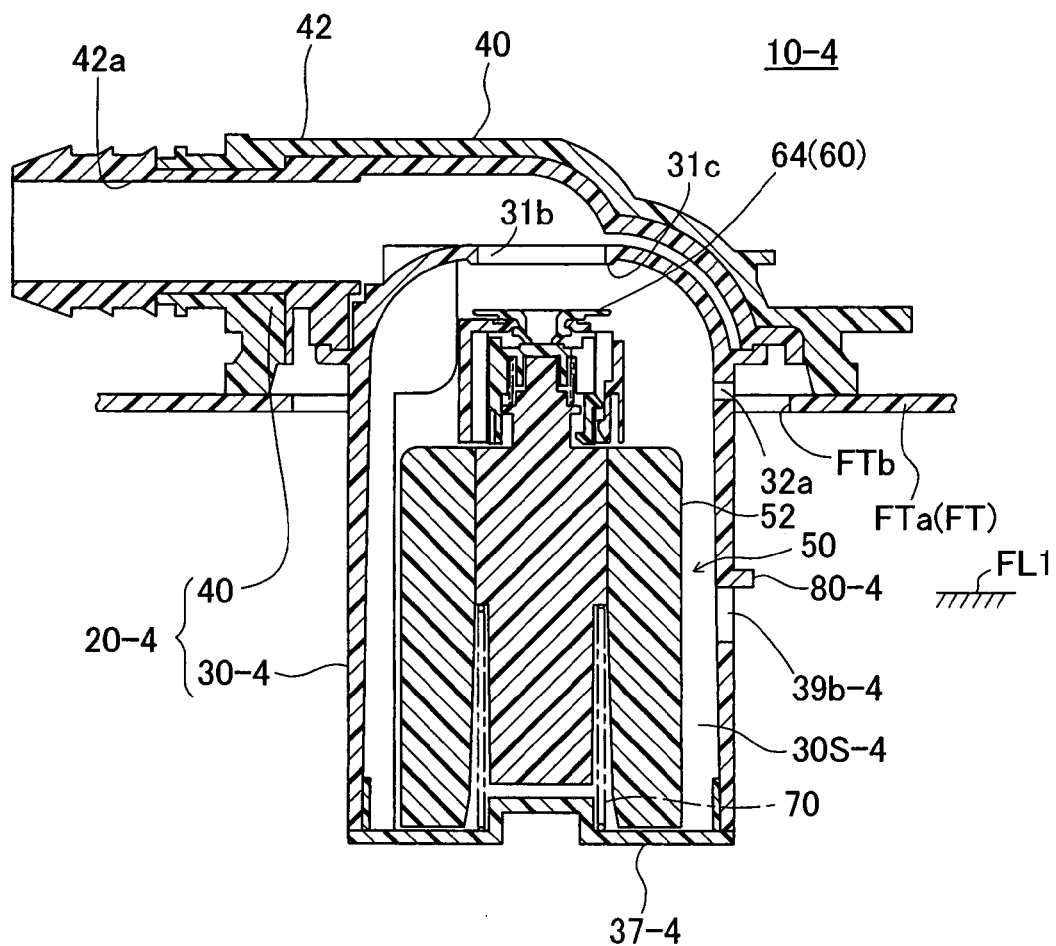
FIG. 13 is a sectional view showing the structure of a fuel cutoff valve in a second embodiment of the invention.
Figure 14:
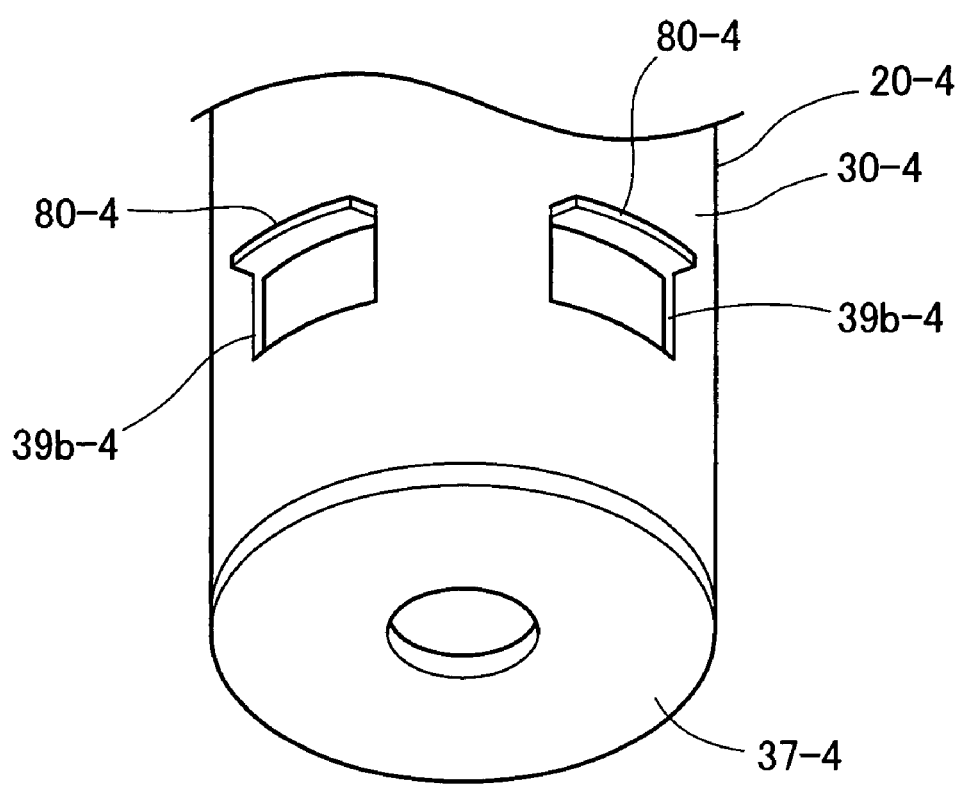
FIG. 14 is a perspective view showing a side wall of a casing in the fuel cutoff valve.

A fuel cutoff valve 10-4 in a second embodiment of the invention is described below. FIG. 13 is a sectional view showing the structure of the fuel cutoff valve 10-4 in the second embodiment of the invention. FIG. 14 is a perspective view showing a side wall of a casing 20-4 in the fuel cutoff valve 10-4. In the fuel cutoff valve 10 of the first embodiment, the cylindrical bottom member 37 is provided below the casing body 30 and has the lower opening 39b. In the fuel cutoff valve 10-4 of the second embodiment, on the other hand, a disk-shaped bottom member 37-4 is provided to cover the bottom of a casing body 30-4 of the casing 20-4 and has multiple openings 39b-4 on the side wall of the casing body 30-4 (that is, on the side wall of the casing 20-4).

Each of the openings 39b-4 has a rectangular shape. The upper side of the rectangular opening 39b-4 is arranged in the horizontal direction and has an extension 80-4 protruded outward. The extension 80-4 is a flat plate having the same length as the upper side and is integrally formed with the casing body 30-4. The extension 80-4 may otherwise be formed separately from the casing body 30-4 and fastened to the casing body 30-4 by thermal caulking or by welding.

(2) Functions and Effects

In the fuel cutoff valve 10-4 of the second embodiment, when the liquid fuel level in the fuel tank FT gradually rises in the course of fuel supply and reaches a predetermined liquid level FL1 that completely closes the openings 39-b4, the inner pressure of the fuel tank FT increases to have a large pressure difference from the inner pressure of a valve chest 30S-4. The large pressure difference enables the liquid fuel to be immediately flowed into the valve chest 30S-4 and activates the auto stop function.

In the fuel cutoff valve 10-4 of the second embodiment described above, the extension 80-4 protruded outward is provided at the position of the upper side of each of the multiple openings 39b-4, which is equivalent to the predetermined liquid level FL1. Like the flange 80 of the first embodiment, the presence of the extensions 80-4 increases the contact area of the openings 39b-4 with the liquid surface at the rise of the liquid fuel level. The structure of the fuel cutoff valve 10-4 of the second embodiment desirably prevents the lowered buoyancy of the float 52 and the resulting delayed action of the valve plug 60 due to the air invaded into the fuel flowed in the valve chest 30S-4, like the fuel cutoff valve 10 of the first embodiment. This arrangement effectively restrains leakage of the fuel from the connection conduit 31b. The outward protrusion of the extensions 80-4 ensures the flow of the fuel vapor.

In the fuel cutoff valve 10-4 of the second embodiment, each of the multiple openings 39b-4 has the outward extension 80-4. In a modified example of the second embodiment, each of the openings 39b-4 may have an inward extension protruded inside the casing 20-4.

C. Third Embodiment (1) Structure

Figure 15:
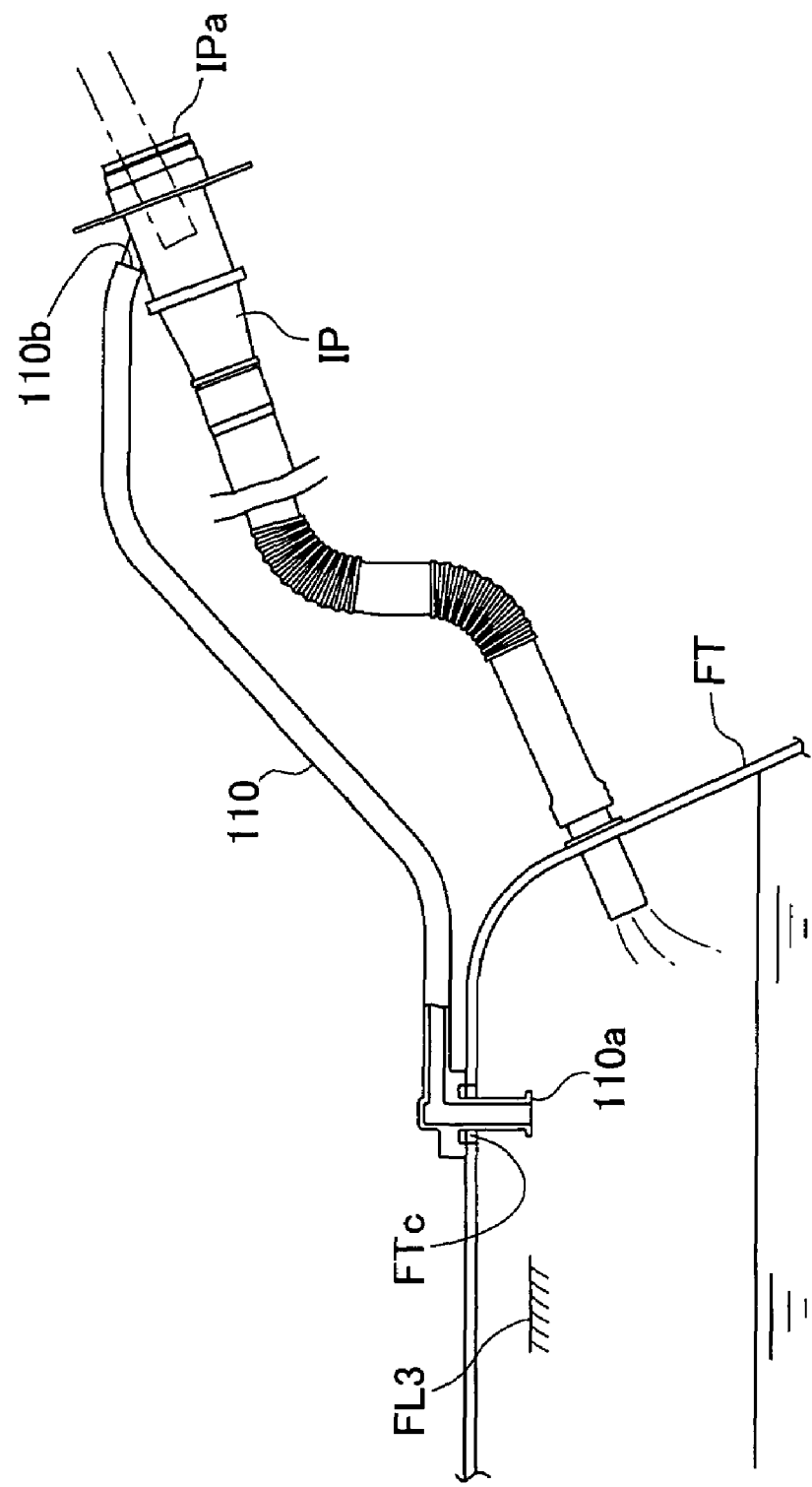
FIG. 15 schematically illustrates the configuration of a feeding device for a fuel tank including a breather pipe in a third embodiment of the invention.

Application of a breather pipe is described below as a third embodiment of the invention. FIG. 15 schematically illustrates the configuration of a feeding device for a fuel tank including a breather pipe 110 in the third embodiment of the invention. Like the first embodiment, a fuel filler pipe IP is connected to an upper portion of a fuel tank FT. The fuel filler pipe IP has a fill port IPa that is opened and closed with a fuel cap. A supply of fuel from a fuel gun is flowed through the fill port IPa into the fuel tank FT. An upper tank wall FTa on the top of the fuel tank FT has a mounting hole FTc, which receives one opening end 110a of the breather pipe 110 inserted therein. The other opening end 110b of the breather pipe 110 is connected to an upstream section of the fuel filler pipe IP.

In the course of fuel supply, the fuel vapor in the fuel tank FT is introduced through the breather pipe 110 into the fuel filler pipe IP and is carried on the liquid fuel flowed through the fuel filler pipe IP to be returned into the fuel tank FT. The breather pipe 110 keeps the liquid surface of fuel in the atmospheric pressure during the fuel supply and prevents the spurt of the fuel flow. When the liquid surface of fuel in the fuel tank FT reaches a predetermined liquid level FL3 that is equivalent to the height of the opening end 110a of the breather pipe 110 located inside the fuel tank FT, the increased inner pressure of the fuel tank FT activates the auto stop function of the breather pipe 110.

Figure 16:
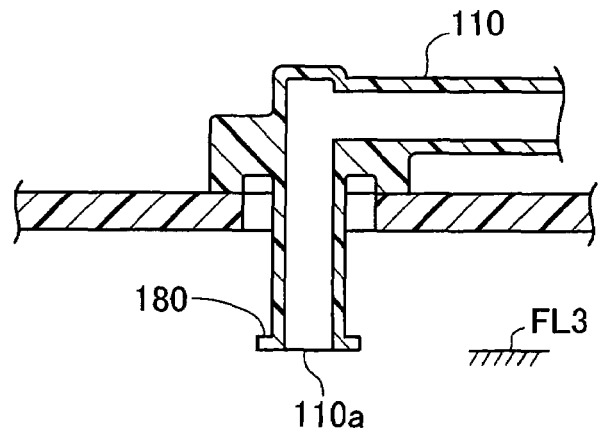
FIG. 16 is a sectional view showing the structure of an opening end of the breather pipe located inside the fuel tank in the third embodiment.

FIG. 16 is a sectional view showing the structure of the opening end 110a of the breather pipe 110 located inside the fuel tank FT in the third embodiment. The opening end 110a of the breather pipe 110 located inside the fuel tank FT has a horizontal ledge 180 protruded in the horizontal direction. The horizontal ledge 180 is a flange (outward flange) that is protruded outward around the whole circumference of the opening end 110a of the breather pipe 110 located inside the fuel tank FT. The horizontal ledge or flange 180 is integrally formed with the breather pipe 110. In one modified structure, the flange 180 may be formed separately from the breather pipe 110 and fixed to its opening end 110*a* by thermal caulking or by welding. In the structure of the embodiment, the breather pipe 110 has a wall thickness of 1 to 2 mm (for example, 1.5 mm). The flange 180 has a width (subtraction of the inner diameter from the outer diameter) of 2 to 5 mm (for example, 3 mm) and a thickness (a dimension in the vertical direction) of 1 to 2 mm (for example, 1.5 mm). These dimensions are not restricted to the above values but may be any suitable values.

(2) Functions and Effects

When the liquid fuel level in the fuel tank FT reaches the predetermined liquid level FL3 in the course of fuel supply, the inner pressure of the fuel tank FT increases to activate the auto stop function of the breather pipe 110. The opening end 110*a* of the breather pipe 110 located inside the fuel tank FT has the flange 180 protruded outward in the horizontal direction. The presence of the flange 180 increases the contact area of the opening end 110*a* of the breather pipe 110 with the liquid fuel of the ascending liquid level. The liquid surface of fuel rises by the surface tension. Under the condition of a sufficiently large contact area of the liquid fuel with the opening end 110*a*, when the liquid fuel level reaches a preset liquid level that is slightly below the predetermined liquid level FL3 or the auto stop level, a raised portion of the liquid surface by the surface tension effect is in contact with the opening end 110*a* over a relatively large contact area. The circumference of the opening end 110*a* is blocked and sealed first by the surface tension effect in the process of closing and blocking the opening end 110*a*. This arrangement effectively interferes with the entrainment of the air from the air layer in the fuel tank FT into the breather pipe 110. Such interference desirably prevents the fuel mixed with the air from being flowed through the breather pipe 110 and splashed as fuel droplets at the fuel supply port (3) Modifications The structure of the breather pipe 110 of the third embodiment may be modified in various ways. Some examples of possible modification are given below.

(3-1) In the breather pipe 110 of the third embodiment, the outward flange 180 is formed around the circumference of the opening end 110*a*. This outward flange 180 may be replaced by an inward flange as in the first modified example of the first embodiment or by an extension with a groove as in the second modified example of the first embodiment. An outward or inward extension protruded in the horizontal direction may be formed along only part of the circumference of the opening end 110*a* as in the third modified example of the first embodiment.

Figure 17:
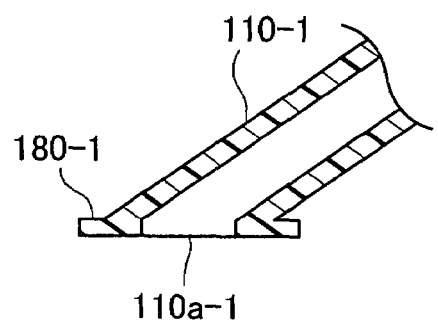
FIG. 17 is a sectional view showing the structure of an opening end of another breather pipe located inside the fuel tank in a modified example of the third embodiment.

(3-2) In the structure of the third embodiment, the opening end 110*a* of the breather pipe 110 is arranged in the vertical direction inside the fuel tank FT. The flange 180 is thus extended perpendicular to the circumferential face of the breather pipe 110 to be protruded in the horizontal direction. In one modified structure, a breather pipe 110-1 has an opening end 110*a*-1 that is inclined to the vertical direction inside the fuel tank FT as shown in FIG. 17. A flange 180-1 is thus extended at an angle from the circumferential face of the breather pipe 110-1 to be protruded in the horizontal direction.

(3-3) In the first and the second embodiments and their modified examples, the fuel cutoff valve is attached to the outer face of the top wall of the fuel tank. The technique of the invention is similarly applicable to a fuel cutoff valve of in-tank type, which is attached to the inner face of the top wall of the fuel tank. In the first through the third embodiments and their modified example, the fuel tank is made of resin. The fuel cutoff valve or the breather pipe of the invention is also applicable to a metal fuel tank.

D. Other Aspects

The present invention may be embodied in the following aspects. For example, in the fuel cutoff valve described above, the casing may have: a casing body that forms the valve chest; and a cylindrical bottom member that is provided below the casing body and has the opening on its lower end. The extension is an outward flange that is protruded outward around the whole circumference of the opening. In the fuel cutoff valve of this structure, the opening at the lower end of the cylindrical bottom member defines the full level, which is detected to activate the auto stop function in the course of fuel supply. The outward flange protruded outward around the whole circumference of the opening prevents invasion of the air into the casing of the fuel cutoff valve in the course of fuel supply to the full level. The outward flange ensures a greater opening area than an inward flange. The larger opening area slows down the flow rate of fuel in the vicinity of the opening and lowers the potential for entrainment of the air. The outward flange also ensures the sufficient passage of fuel vapor, compared with an inward flange.

In the fuel cutoff valve described above, the outward flange may have a groove that is cut around the circumference of a lower face. This structure also increases the contact area of the opening with the liquid surface at the rise of the liquid fuel level, compared with the conventional structure without any extension or flange.

In the fuel cutoff valve described above, the casing may have: a casing body that forms the valve chest; and a cylindrical bottom member that is provided below the casing body and has the opening on its lower end. The extension is an inward flange that is protruded inward around the whole circumference of the opening. The inward flange gives a smaller opening area and desirably reduces a potential error in detection of the full level even in the case of an inclined rise of the liquid fuel surface.

It is also preferable that the opening is formed in a side wall of the casing and has an upper side linearly arranged in the horizontal direction. The extension is protruded outward from the upper side of the opening. In the fuel cutoff valve of this structure, the position of the opening defines the full level, which is detected to activate the auto stop function in the course of fuel supply. The extension is protruded outward from the upper side of the opening. The outward extension prevents invasion of the air into the casing of the fuel cutoff valve in the course of fuel supply to the full level. The outward extension also ensures the sufficient passage of fuel vapor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fuel cutoff valve that is attached to an upper portion of a fuel tank and opens and closes a connection conduit for connecting inside of the fuel tank with outside, the fuel cutoff valve comprising:
   a casing that forms a valve chest for communicating the inside of the fuel tank with the connection conduit and has an opening, which is opened from the valve chest to the inside of the fuel tank and is closed by a rise of a liquid fuel level in the fuel tank to a predetermined liquid level to increase a pressure difference between an inner pressure of the fuel tank and an inner pressure of the valve chest;

a float that is placed in the valve chest and lifts up and down with an increase and decrease of buoyancy caused by a variation in liquid fuel level in the valve chest; and a valve plug that is attached to the float and lifts up and down with the float to close and open the connection conduit, wherein the casing includes a casing body, which forms the valve chest, and a cylindrical bottom member, which is provided below the casing body, the bottom member includes a cylindrical element and a bottom plate, the bottom plate includes an aperture and is provided at an upper end of the cylindrical element, and the opening is formed on a lower end of the cylindrical element and has an extension that is protruded in a horizontal direction.

2. The fuel cutoff valve in accordance with claim 1, wherein the extension is an outward flange that is protruded outward around the entire circumference of the opening.

3. The fuel cutoff valve in accordance with claim 2, wherein the outward flange has a groove that is cut around the circumference of a lower face.

4. The fuel cutoff valve in accordance with claim 1, wherein the extension is an inward flange that is protruded inward around the entire circumference of the opening.

* * * * *